United States Patent [19]

Okada et al.

[11] Patent Number: 5,661,532
[45] Date of Patent: Aug. 26, 1997

[54] CHIRAL SMECTIC LIQUID CRYSTAL DEVICE

[75] Inventors: Shinjiro Okada, Isehara; Osamu Taniguchi, Chigasaki; Hironobu Mizuno, Hiratsuka; Yutaka Inaba, Kawaguchi, all of Japan

[73] Assignee: Canon Kabushiki Kaisha, Tokyo, Japan

[21] Appl. No.: 186,104

[22] Filed: Jan. 25, 1994

Related U.S. Application Data

[62] Division of Ser. No. 828,123, Jan. 30, 1992, Pat. No. 5,303,076.

[30] Foreign Application Priority Data

Feb. 1, 1991 [JP] Japan ..................... 3-31390

[51] Int. Cl.$^6$ ................................... G02F 1/1337
[52] U.S. Cl. ............................... 349/135; 349/133
[58] Field of Search ..................... 359/75, 76, 77, 359/78, 100, 104, 54, 87; 349/123, 124, 133, 135

[56] References Cited

U.S. PATENT DOCUMENTS

| | | | |
|---|---|---|---|
| 4,639,089 | 1/1987 | Okada et al. | 350/341 |
| 4,681,404 | 7/1987 | Okada et al. | 350/350 |
| 4,682,858 | 7/1987 | Kanbe et al. | 350/334 |
| 4,712,873 | 12/1987 | Kanbe et al. | 350/337 |
| 4,712,874 | 12/1987 | Sekimura et al. | 350/339 F |
| 4,712,875 | 12/1987 | Tsuboyama et al. | 350/344 |
| 4,712,877 | 12/1987 | Okada et al. | 350/350 |
| 4,714,323 | 12/1987 | Katagiri et al. | 350/350 S |
| 4,728,176 | 3/1988 | Tsuboyama et al. | 350/350 S |
| 4,738,515 | 4/1988 | Okada et al. | 350/350 S |
| 4,740,060 | 4/1988 | Komura et al. | 350/344 |
| 4,765,720 | 8/1988 | Toyono et al. | 350/350 S |
| 4,778,259 | 10/1988 | Kitayama et al. | 350/350 S |
| 4,781,441 | 11/1988 | Kanbe et al. | 350/350 S |
| 4,796,979 | 1/1989 | Tsuboyama | 350/350 S |
| 4,796,980 | 1/1989 | Kaneko et al. | 350/350 S |
| 4,820,026 | 4/1989 | Okada et al. | 350/341 |
| 4,846,560 | 7/1989 | Tsuboyama et al. | 350/350 S |
| 4,859,036 | 8/1989 | Yamanaka et al. | 350/336 |
| 4,883,344 | 11/1989 | Okada et al. | 350/339 R |
| 4,932,757 | 6/1990 | Hanyu et al. | 350/339 R |
| 4,932,758 | 6/1990 | Hanyu et al. | 350/350 S |
| 5,000,545 | 3/1991 | Yoshioka et al. | 350/336 |
| 5,007,716 | 4/1991 | Hanyu et al. | 350/336 |
| 5,026,144 | 6/1991 | Taniguchi et al. | 350/350 S |
| 5,046,822 | 9/1991 | Matsuda et al. | 359/75 |
| 5,109,291 | 4/1992 | Inaba | 359/56 |
| 5,119,221 | 6/1992 | Nakajima et al. | 359/78 |
| 5,202,779 | 4/1993 | Shinomiya | 354/78 |
| 5,223,963 | 6/1993 | Okada et al. | 359/78 |

FOREIGN PATENT DOCUMENTS 0223727 9/1988 Japan .

*Primary Examiner*—William L. Sikes
*Assistant Examiner*—James A. Dudek
*Attorney, Agent, or Firm*—Fitzpatrick, Cella, Harper & Scinto

[57] ABSTRACT

A liquid crystal device having a first substrate on which a first group of belt-shaped electrodes are formed, a second substrate on which a second group of belt-shaped electrodes are formed so as to cross the first group of belt-shaped electrodes, and a chiral smectic liquid crystal arranged between the first and second substrates, wherein a first orientation film formed on the first group of belt-shaped electrodes and second orientation films formed in spaces among the belt-shaped electrodes are different.

5 Claims, 6 Drawing Sheets

F I G. 1
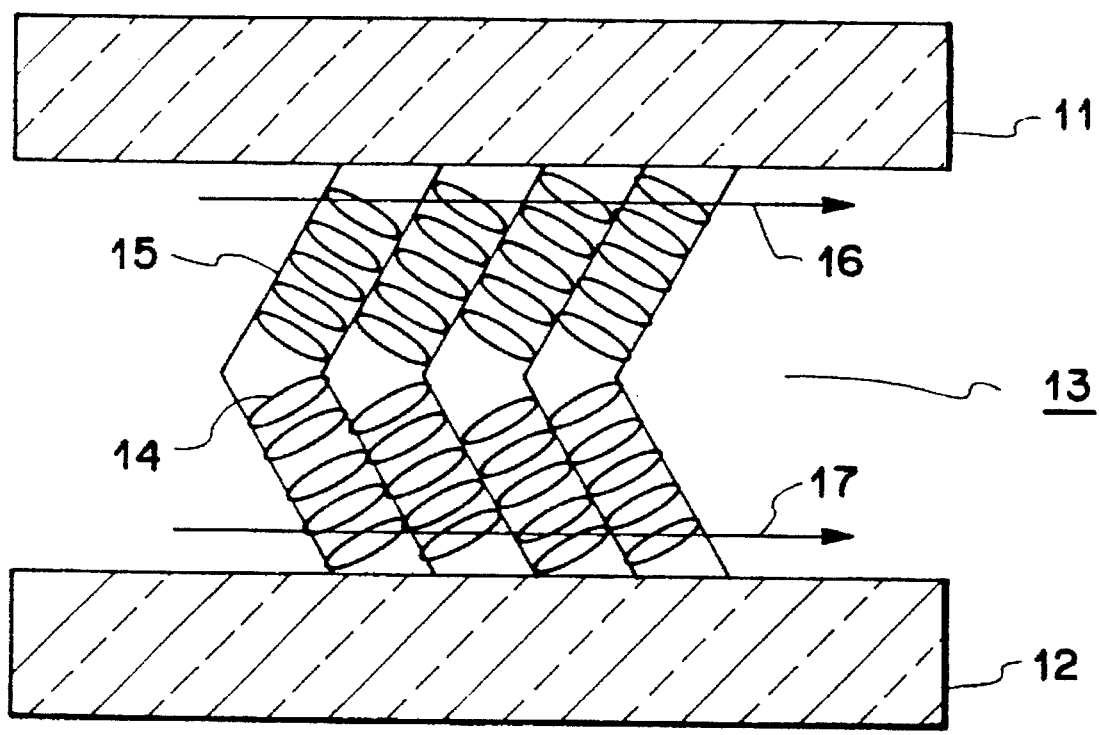

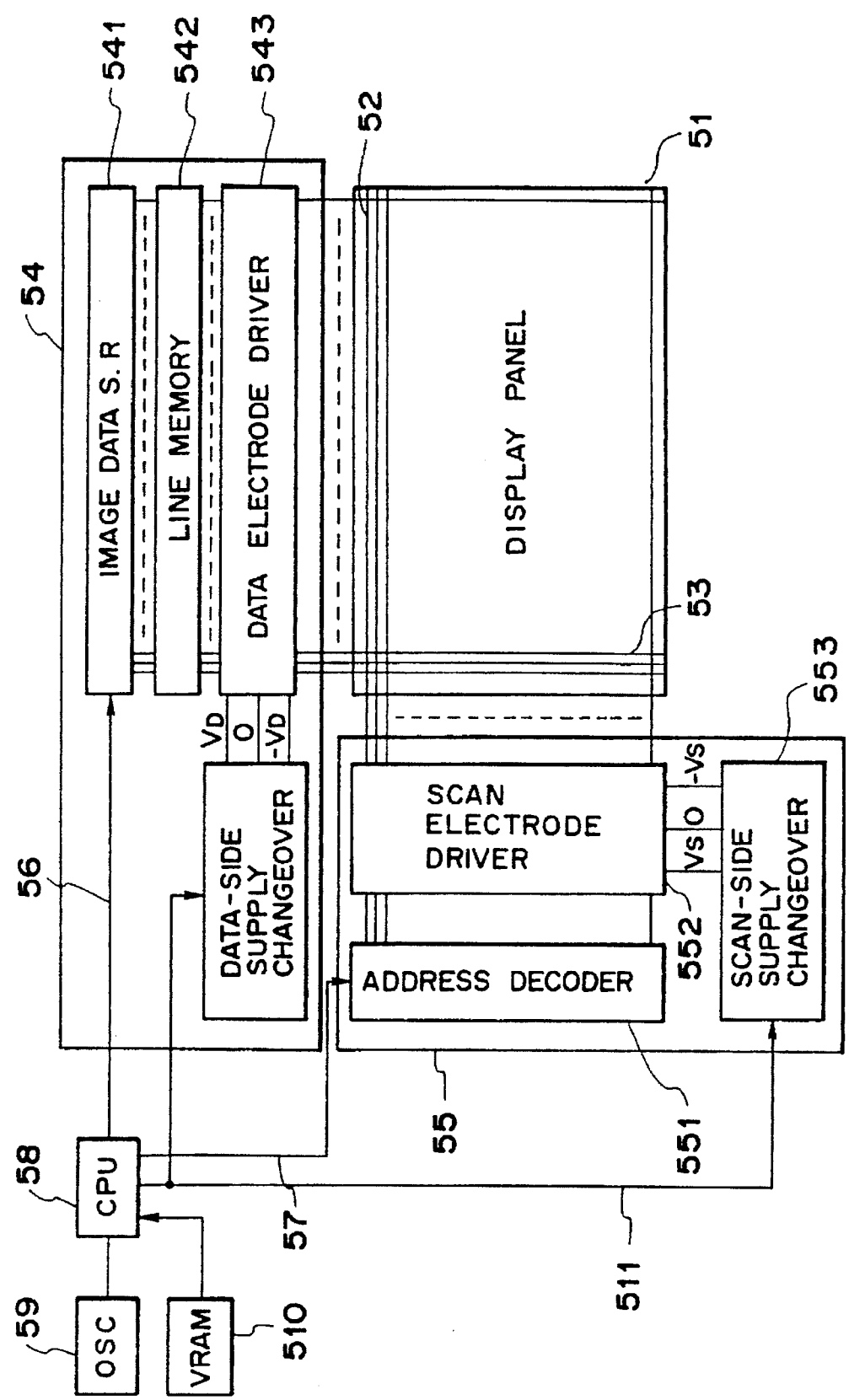

5,661,532

CHIRAL SMECTIC LIQUID CRYSTAL DEVICE

This application is a division of application Ser. No. 07/828,123, filed Jan. 30, 1992 U.S. Pat. No. 5,303,076.

BACKGROUND OF THE INVENTION

1. Field of the Invention

The invention relates to a device using a chiral smectic liquid crystal which exhibits ferroelectricity and also relates to a display apparatus.

2. Related Background Art

With respect to a display apparatus using a ferroelectric chiral smectic liquid crystal, there have been known display apparatuses in each of which a ferroelectric chiral smectic liquid crystal (hereinafter, referred to as an FLC) is injected in a liquid crystal cell which is constructed by arranging two glass substrates in which transparent electrodes are formed on inner surfaces and an orienting process has been performed so as to face each other while keeping a cell gap of about 1 to 3 µm as disclosed in, for instance, U.S. Pat. Nos. 4,639,089, 4,681,404, 4,682,858, 4,712,873, 4,712,874, 4,712,875, 4,712,877, 4,714,323, 4,728,176, 4,738,515, 4,740,060, 4,765,720, 4,778,259, 4,796,979, 4,796,980, 4,859,036, 4,932,757, 4,932,758, 5,000,545, and 5,007,716, and the like.

Among the above background arts, in particular, a device in which the FLC is oriented by forming a chevron structure shown in FIG. 1 has excellent light state under a cross nicols, so that an enough large contrast is obtained. FIG. 1 shows a cross sectional view of an orienting state of the FLC arranged between substrates 11 and 12. An LFC 13 forms a layer 15 comprising a plurality of liquid Crystal molecules 14. A plurality of layers 15 are aligned in the same direction and a structure in which the layers 15 are bent occurs. At this time, it is preferable that the major axis of the liquid crystal molecule 14 is inclined for the substrates 11 and 12 at a pretilt angle of, preferably, 5° or more. As for the above aligning state, it is desirable that the orienting process is performed to the substrates 11 and 12 by rubbings 16 and 17 in the same direction.

FIG. 2 is a plan view of the device in which the FLC 13 of the above chevron structure is formed. Reference numeral 21 in FIG. 2 denotes a sealing material to seal the substrates 11 and 12. Although not shown, in the above device, a plurality of a first group of belt-shaped electrodes to apply a voltage are arranged on the substrate 11, and a plurality of second group of belt-shaped electrodes are arranged on the substrate 12 so as to cross the first group of belt-shaped electrodes, thereby forming matrix electrodes. A normal line 22 (On a plane surface) of the layer 14 of the FLC 13 is substantially parallel with the rubbing directions 16 and 17. In the device shown in FIG. 2, the liquid crystal molecules 14 are uniformly tilted to the left (on the plane surface) at an angle of +θ (spontaneous polarization is set to a polarity directing from the upper portion of the paper surface to the lower portion).

According to the experiments by the inventors et al., by applying a voltage (for instance, AC voltage of ±8 volts at 10 Hz) across the upper and lower electrodes of the above matrix electrodes under such a state, the liquid crystal molecules 14 start flowing toward the right side in the layer 15. When such a voltage is continuously applied for a long time (for instance, 20 to 50 hours), as shown in FIG. 3, a region 31 in which the number of liquid crystal molecules 14 has decreased or which has been depleted occurs in the left side portion. On the other hand, a region 32 in which the number of liquid crystal molecules 14 has increased is formed in the right side portion. The inventors et al. consequently have found out a problem such that an interference color appears over the whole plane surface of the device and the display quality is lost.

In the case where the liquid crystal molecules 14 in FIG. 2(c) are tilted to the right (on the plane surface) at an angle of −θ (spontaneous polarization is set to a polarity directing from the lower portion on the paper surface to the upper portion), it has been also found out that the liquid crystal molecules start flowing toward the left side on the contrary to the above case.

SUMMARY OF THE INVENTION

It is an object of the invention to provide a liquid crystal device or a display apparatus which can solve or suppress the above problems.

According to the invention, there is provided a liquid crystal device having a first substrate on which a first group of belt-shaped electrodes are formed, a second substrate on which a second group of belt-shaped electrodes are formed so as to cross the first group of belt-shaped electrodes, and a chiral smectic liquid crystal arranged between the first and second substrates, wherein a first orientation film provided on the first group of belt-shaped electrodes and second orientation films provided in spaces among the belt-shaped electrodes are different.

BRIEF DESCRIPTION OF THE DRAWINGS

FIG. 1 is a cross sectional view showing a liquid crystal aligning state used in the invention;

FIG. 5 is a block diagram of a display apparatus of the invention; and

DETAILED DESCRIPTION OF THE PREFERRED EMBODIMENTS

Figure 2A:
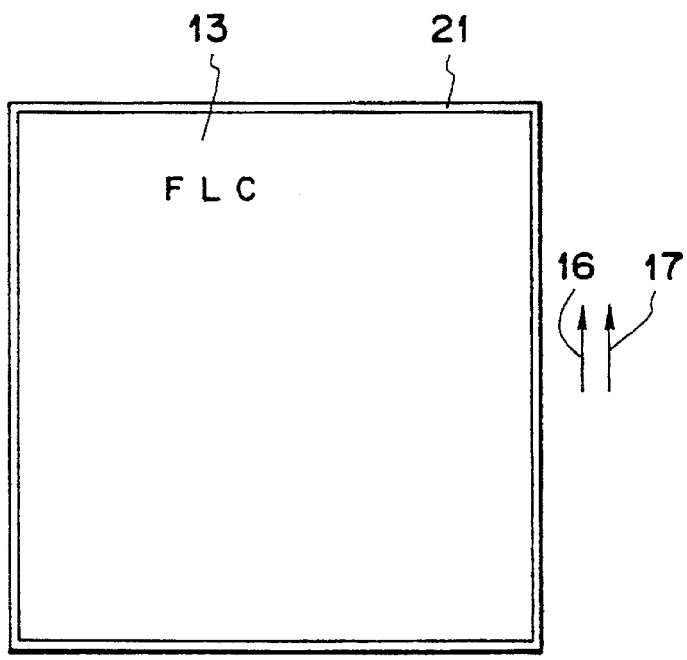
FIG. 2(a) is a plan view of FIG. 1.
Figure 2B:
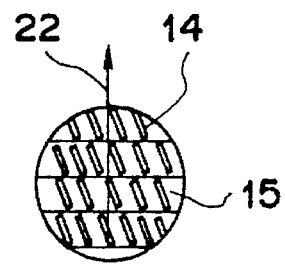
FIG. 2(b) is an enlarged plan view of FIG. 2(a)
Figure 2C:
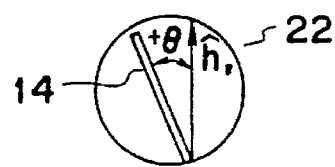
FIG. 2(c) is an enlarged plan view of FIG. 2(b)
Figure 3:
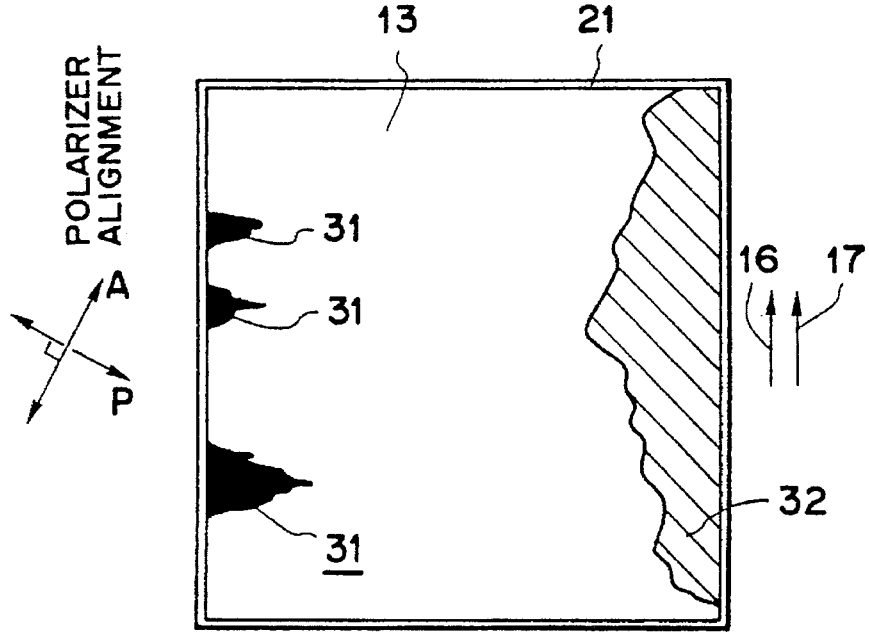
FIG. 3 is a plan view showing a state in the case where a conventional device is used.
Figure 4A:
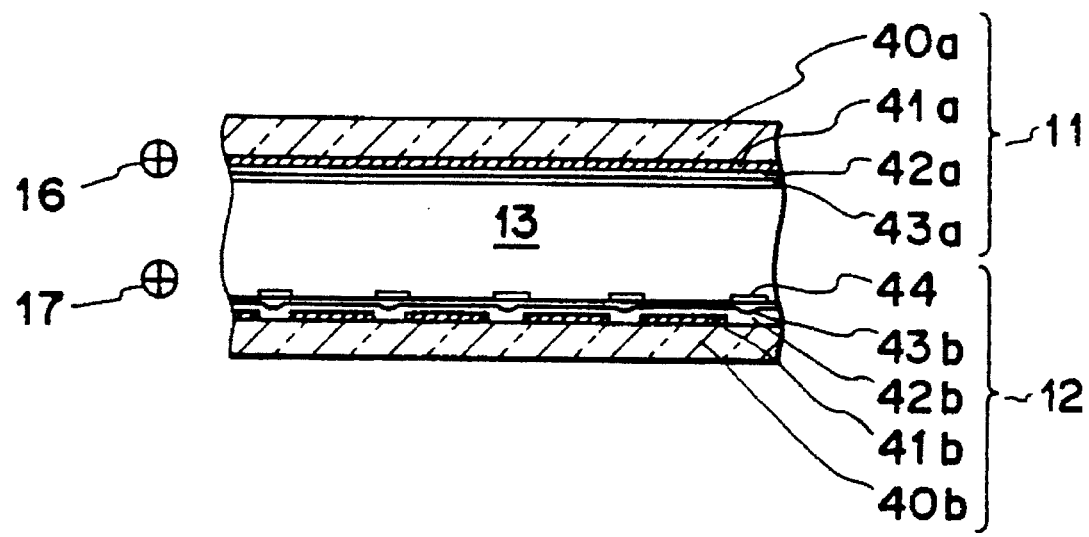
FIG. 4(a) is a plan view showing a device of the invention.
Figure 4B:
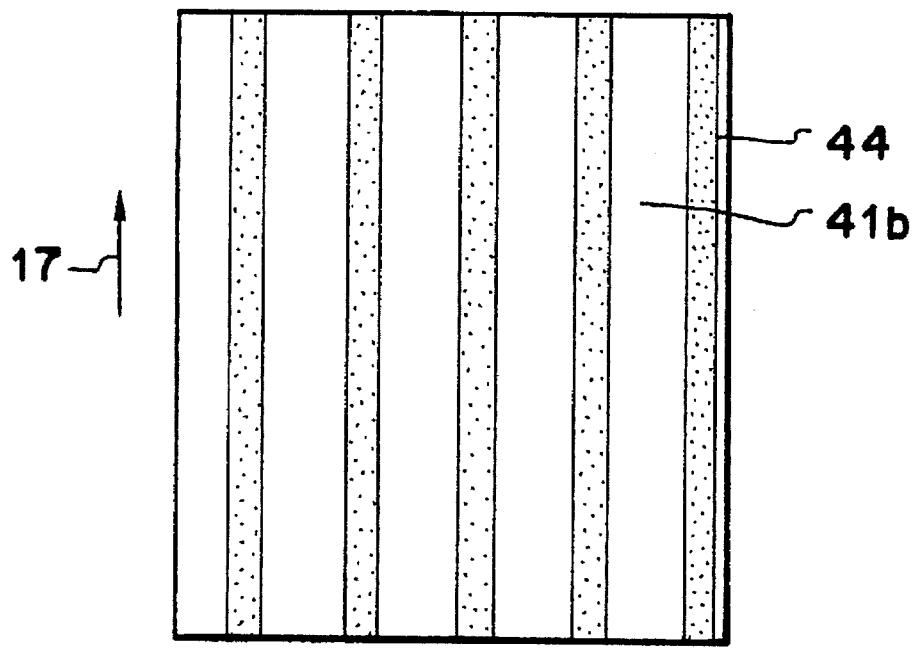
FIG. 4(b) is a plan view of a substrate 12 used in the device of the invention.

An embodiment of the invention is shown in FIG. 4. The substrate 11 in FIG. 4 is constructed by: a glass substrate 40a; a first group of belt-shaped electrodes 41a; a film 42a of an inorganic insulating material such as tantalum oxide ($Ta_2O_5$) or the like; and a homogeneous orientation film 43a such as a polyimide film which has been rubbing processed. The substrate 12 is constructed by: a glass substrate 40b; a second group of belt-shaped electrodes 41b (which cross the belt-shaped electrodes 41a); a film 42b of an inorganic insulating material such as tantalum oxide ($Ta_2O_5$) or the like; an orientation film 43b such as a polyimide film (the same kind as the orientation film 43a) which has been rubbing processed; and homeotropic orientation films 44 arranged in spaces among the belt-shaped electrodes 41b.

The first group of belt-shaped electrodes 41a and the second group of belt-shaped electrodes 41b are formed by transparent conductive films having thicknesses in a range from 300 Å to 3000 Å. In addition to $Ta_2O_5$, $TiO_2$, $SnO_2$, or the like can be used as a film of the inorganic insulating material and such a film is formed so as to have a thickness within a range from 500 Å to 5000 Å.

The homeotropic orientation film 44 can be formed by a film of a hydrocarbon compound containing fluorine or silane compound containing fluorine such as fluorochloromethane, fluorochloroethane, fluoromethoxysilane, fluoroethoxysilane, or the like. It is preferable to set a film thickness to a value within a range from 10 Å to 1000 Å.

In the device shown in FIG. 4, the FLC 13 existing in the intersecting portion between the first group of belt-shaped electrodes 41a and the second group of belt-shaped electrodes 41b is in an aligning state of the chevron structure shown in FIG. 1. On the other hand, the FLC in the non-intersecting portion is influenced by the homeotropic orientation films 44 and causes an aligning state different from the chevron structure.

According to the invention, the orientation films of the same kind as that of the homeotropic orientation films 44 are arranged in the spaces among the second group of belt-shaped electrodes 41b so as to come into contact with the FLC 13, so that the foregoing problems can be further solved or suppressed.

FIG. 5 is a block diagram illustrating a structural arrangement of an embodiment of the display apparatus according to the present invention. A display panel 51 (shown in FIG. 4) is composed of scanning electrodes 52, data electrodes 53, and an FLC having the chevron structure shown in FIG. 1 and disposed therebetween. The orientation of the ferroelectric liquid crystal is controlled by an electric field at each intersection of the scanning electrodes and data electrodes formed due to voltages applied across the electrodes.

The display apparatus includes a data electrode driver circuit 54, which in turn comprises an image data shift register 541 for storing image data serially supplied from a data signal line 56, a line memory 542 for storing image data supplied in parallel from the image data shift register 541, a data electrode driver 543 for supplying voltages to the data electrodes 53 according to the image data stored in the line memory 542, and a data side power supply changeover unit 544 for changing over among voltages $V_D$, 0, and $-V_D$ supplied to the data electrodes 53 based on a signal from a changeover control line 511.

The display apparatus further includes a scanning electrode driver circuit 55, which in turn comprises a decoder 551 for designating a scanning electrode among all of the scanning electrodes based on a signal received from a scanning address data line 57, a scanning electrode driver 552 for applying voltages to the scanning electrodes 52 based on a signal from the decoder 551, and a scanning side power supply changeover unit 553 for changing over among voltages $V_S$, 0, and $-V_S$ supplied to the scanning electrodes 52 based on a signal from the changeover control line 511.

The display apparatus further includes a CPU 58, which receives clock pulses from an oscillator 59, controls an image memory 510, and controls the signal transfer over the data signal line 56, scanning address data line 57, and changeover control line 511.

Figure 6:
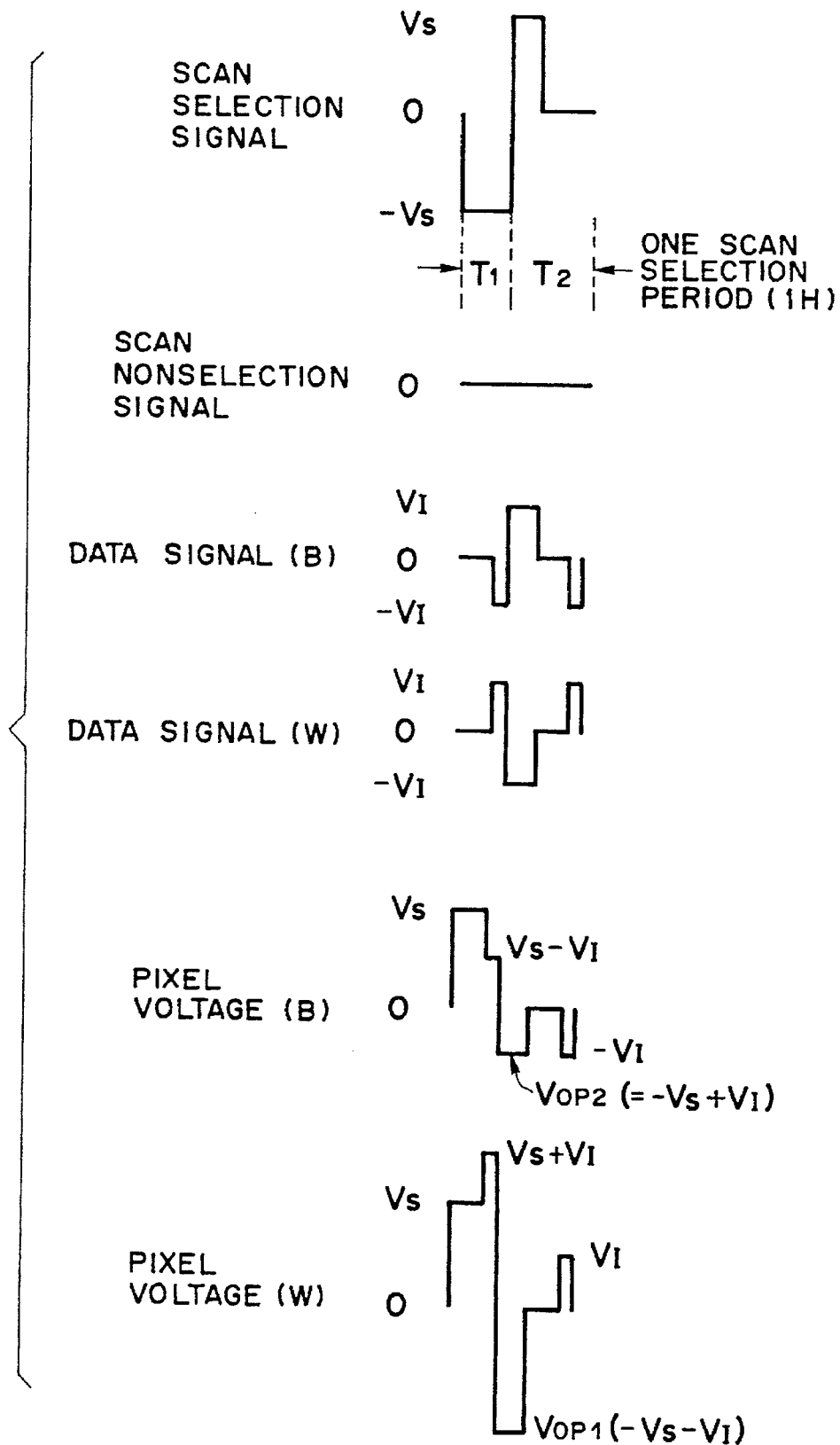
FIGS. 6 and 7 are waveform diagrams showing driving waveforms used in the invention.

FIG. 6 shows a set of drive voltage signal waveforms used in the present invention. In one scanning selection period, a scanning selection signal having alternating voltages $\pm V_S$ and a voltage 0 is applied to a scanning electrode, wherein the voltages $\pm V_S$ and the voltage 0 are values defined with reference to the voltage level of a scanning non-selection signal. The data electrodes are supplied with a black or white data signal depending on given data. In the embodiment, the pixels on a scanning electrode supplied with a scanning selection signal are simultaneously erased into a black state in a period $T_1$ during one scanning selection period, and then in a subsequent period $T_2$, a pixel supplied with a data signal (B) is set to a black state and a pixel supplied with a data signal (W) is set to a white state.

In the apparatus of the present invention, temperature compensation may be effected by modulating (changing) the length of one scanning selection period (1H) and the magnitude of a drive voltage peak value $V_{OP}$ (capable of writing in black or white) which is $V_{OP1}$ or $V_{OP2}$ giving a maximum value during the period $T_2$.

Figure 7:
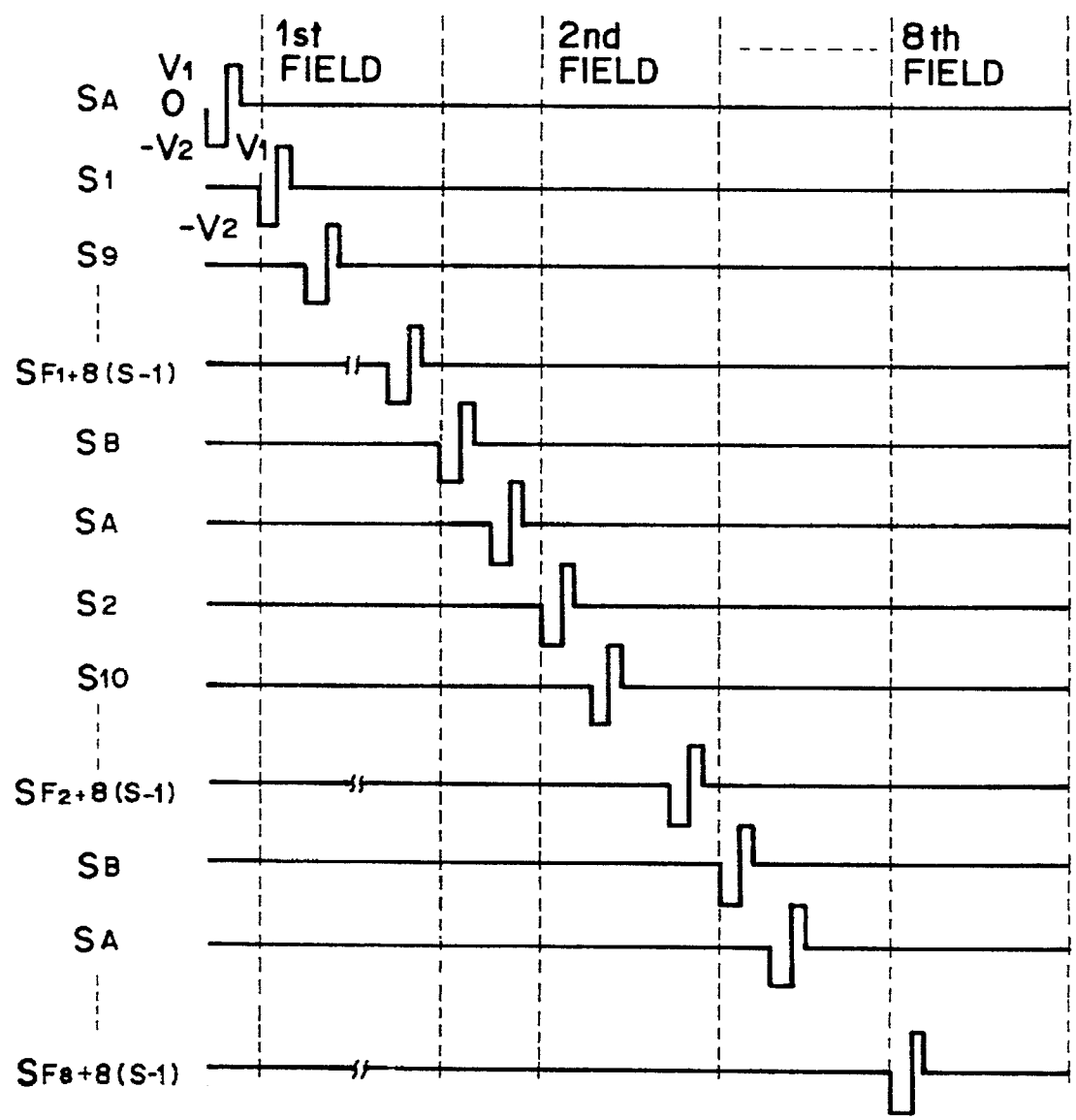

FIG. 7 is a waveform diagram showing an example of a sequence of applying a scanning selection signal shown in FIG. 6 to the scanning electrodes. According to the scanning sequence shown in FIG. 7, a scanning selection signal is sequentially applied to the scanning electrodes $S_1, S_2, \ldots, S_{F8+8(s-1)}$ every 8th electrode (7 electrodes apart) in one vertical scanning (field scanning) and one picture is formed through 8 times of field scanning to complete one frame scanning. In this instance, in each field scanning, the scanning selection signal is also applied to the scanning electrodes $S_A$ and $S_B$ in the non-display region. In FIG. 7, the symbols $F_1, F_2, \ldots, F_8$ each represents an ordinal number of field scanning in one frame scanning and the symbol s represents an ordinal number of scanning in one field scanning.

A series of experiments were conducted wherein the above-mentioned display operation was repeated by using a ferroelectric liquid crystal panel with the dimensions and drive conditions as shown below and the driving signal waveforms shown in FIGS. 6 and 7 while applying the scanning selection signal to the scanning electrodes 52 electrodes apart (in every 8th electrode).

What is claimed is:

1. A method for producing a chiral smectic liquid crystal device comprising first and second substrates provided with first and second groups of belt-shaped electrodes arranged to cross each other, said method comprising the steps of:

providing the first group of belt-shaped electrodes on one surface of the first substrate;

providing a film formed by a hydrocarbon compound containing fluorine or silane compound containing fluorine in a space among the first group of belt-shaped electrodes on one surface of the first substrate;

providing a rubbed polyimide film on the first group of belt-shaped electrodes;

providing the second group of belt-shaped electrodes on one surface of the second substrate;

providing a film formed by a hydrocarbon compound containing fluorine or a silane compound containing fluorine in a space among the second group of belt-shaped electrodes on one surface of the second substrate; and providing a rubbed polyimide film on the second group of belt-shaped electrodes.

2. A method according to claim 1, further comprising a step of forming an inorganic insulating film between said first group of belt-shaped electrodes and said rubbed polyimide film.

3. A method according to claim 1, wherein the chiral smectic liquid crystal provided at an intersection between said first and second groups of belt-shaped electrodes has an orientation state of a chevron structure.

4. A method according to claim 1, wherein the chiral smectic liquid crystal not provided at an intersection between said first and second groups of belt-shaped electrodes has an orientation state of non-chevron structure.

5. A method according to claim 1, wherein said film formed by polyamide compound containing fluorine or silane has a thickness of 10–1000 Å.

* * * * *